United States Patent
Wu et al.

(10) Patent No.: US 12,547,571 B2
(45) Date of Patent: Feb. 10, 2026

(54) CONNECTION INTERFACE AND LANE CONNECTION METHOD THEREOF ADAPTED FOR DIE-TO-DIE

(71) Applicant: Inpsytech, Inc., Hsinchu County (TW)

(72) Inventors: Yu-Hsi Wu, Hsinchu County (TW); Hsin-Shih Wang, Hsinchu County (TW); Jian-Ying Chen, Hsinchu County (TW); Wei-Ren Shiue, Hsinchu County (TW)

(73) Assignee: INPSYTECH, INC., Hsinchu County (TW)

( * ) Notice: Subject to any disclaimer, the term of this patent is extended or adjusted under 35 U.S.C. 154(b) by 231 days.

(21) Appl. No.: 18/386,404

(22) Filed: Nov. 2, 2023

(65) Prior Publication Data
US 2025/0028670 A1 Jan. 23, 2025

(30) Foreign Application Priority Data
Jul. 21, 2023 (TW) .................................. 112127436

(51) Int. Cl.
G06F 13/40 (2006.01)
G06F 11/20 (2006.01)
H04L 1/22 (2006.01)
H04L 12/40 (2006.01)

(52) U.S. Cl.
CPC ...... *G06F 13/4068* (2013.01); *G06F 11/2007* (2013.01); *H04L 1/22* (2013.01); *H04L 12/40176* (2013.01)

(58) Field of Classification Search
CPC .. G06F 13/4068; G06F 3/0635; G06F 3/0614; G06F 3/0616; G06F 3/0617; G06F 3/0619; G06F 11/20; G06F 11/2002; G06F 11/2007; H04L 1/22; H04L 12/40176; H04B 1/74
See application file for complete search history.

(56) References Cited

U.S. PATENT DOCUMENTS

| | | | |
|---|---|---|---|
| 6,982,954 B2 * | 1/2006 | Dhong | G06F 11/2007 370/248 |
| 2025/0015939 A1 * | 1/2025 | Elkanovich | H04L 1/0047 |

* cited by examiner

*Primary Examiner* — Idriss N Alrobaye
*Assistant Examiner* — Richard B Franklin
(74) *Attorney, Agent, or Firm* — Birch, Stewart, Kolasch & Birch, LLP

(57) ABSTRACT

A connection interface adapted for die-to-die includes a plurality of first usage lanes, a plurality of first spare lanes, a plurality of receiving lanes, and a controller. The controller is configured to connect each of the plurality of receiving lanes to a corresponding one of the plurality of first usage lanes and to respectively monitor the plurality of first usage lanes. In response to that any of the plurality of first usage lanes is monitored as an unhealthy lane by the controller, the controller changes one of the plurality of receiving lanes which is currently connected to the unhealthy lane to be instead connected to one of the plurality of first spare lanes.

8 Claims, 8 Drawing Sheets

CONNECTION INTERFACE AND LANE CONNECTION METHOD THEREOF ADAPTED FOR DIE-TO-DIE

CROSS-REFERENCE TO RELATED APPLICATION

This non-provisional application claims priority under 35 U.S.C. § 119 (a) to patent application No. 112127436 filed in Taiwan, R.O.C. on Jul. 21, 2023, the entire contents of which are hereby incorporated by reference.

BACKGROUND

Technical Field

The present disclosure provides a connection interface and a lane connection method thereof. In particular, one or some embodiments of the present disclosure provides a high-speed connection interface and a lane connection method thereof adapted for using die-to-die (D2D) connection technology.

Related Art

With the rapid evolution of high-performance computing (HPC) and artificial intelligence (AI) technologies, the die-to-die (D2D) technology which can package a large circuit into multiple small modules to form a multi-chip module has become one of the important technologies for current semiconductor packaging. Generally, a high-speed transmission is performed between two dies of a transmission system through the connection lanes of a bridging substrate. However, after the transmission system runs for a period, problems such as transmission attenuation may occur in any of the connection lanes of the bridging substrate, thereby affecting the transmission quality of the transmission system. Furthermore, in response to that any of the connection lanes of the bridging substrate is damaged, the high-speed transmission between the two dies cannot be performed and thus the transmission is interrupted.

SUMMARY

In some embodiments, the present disclosure provides a connection interface adapted for die-to-die. The connection interface includes a plurality of first usage lanes, a plurality of first spare lanes, a plurality of receiving lanes, and a controller. The controller is configured to connect each of the plurality of receiving lanes to a corresponding one of the plurality of first usage lanes and to respectively monitor the plurality of first usage lanes. In response to that any of the plurality of first usage lanes is monitored, by the controller, as an unhealthy lane, the controller changes one of the plurality of receiving lanes which is currently connected to the unhealthy lane to be instead connected to one of the plurality of first spare lanes.

In some embodiments, the present disclosure provides a lane connection method adapted for die-to-die. The lane connection method includes: connecting a plurality of receiving lanes of a connection interface to a plurality of first usage lanes of the connection interface, wherein each of the plurality of receiving lanes is connected to a corresponding one of the plurality of first usage lanes; respectively monitoring the plurality of first usage lanes; and changing one of the plurality of receiving lanes which is currently connected to an unhealthy lane to be instead connected to one of a plurality of first spare lanes of the connection interface in response to monitoring that any of the plurality of first usage lanes as the unhealthy lane.

To sum up, according to one or some embodiments of the present disclosure, the connection interface and the lane connection method thereof adapted for die-to-die can monitor the data transmission status of each of the plurality of first usage lanes connected to the plurality of receiving lanes. In response to that any of the plurality of first usage lanes is monitored as an unhealthy lane, one of the plurality of receiving lanes which is currently connected to the unhealthy lane is changed to be instead connected to one of the plurality of first spare lanes. In this way, the data can be switched from being transmitted on the first usage lane with poor data transmission status to the first spare lane with better data transmission status, thereby improving the data transmission quality. Furthermore, due to the monitoring of the data transmission status of each first usage lane, a processing module of the connection interface can find out the connection lane that is about to be damaged in the bridging substrate in advance, and the processing module then changes to use another connection lane and the first spare lane for transmission. Therefore, the data transmission between the two dies will not be interrupted due to the damage of the connection lane, and the high-speed transmission between the two dies can be maintained.

Detailed features and advantages of the present disclosure are described in detail in the following implementations, and the content of the implementations is sufficient for a person skilled in the art to understand and implement the technical content of the present disclosure. A person skilled in the art can easily understand the objectives and advantages related to the present disclosure according to the contents disclosed in this specification, the claims, and the drawings.

DETAILED DESCRIPTION

To make the objectives, features, and advantages of the embodiments of the present disclosure more comprehensible, the following provides detailed descriptions with reference to the accompanying drawings.

It should be noted that the term "include/comprise" used in the description is configured to indicate the existence of specific technical features, values, method steps, operations, elements, and/or components, but not to exclude adding more technical features, values, method steps, operations, elements, or any combination of the above.

Figure 1:
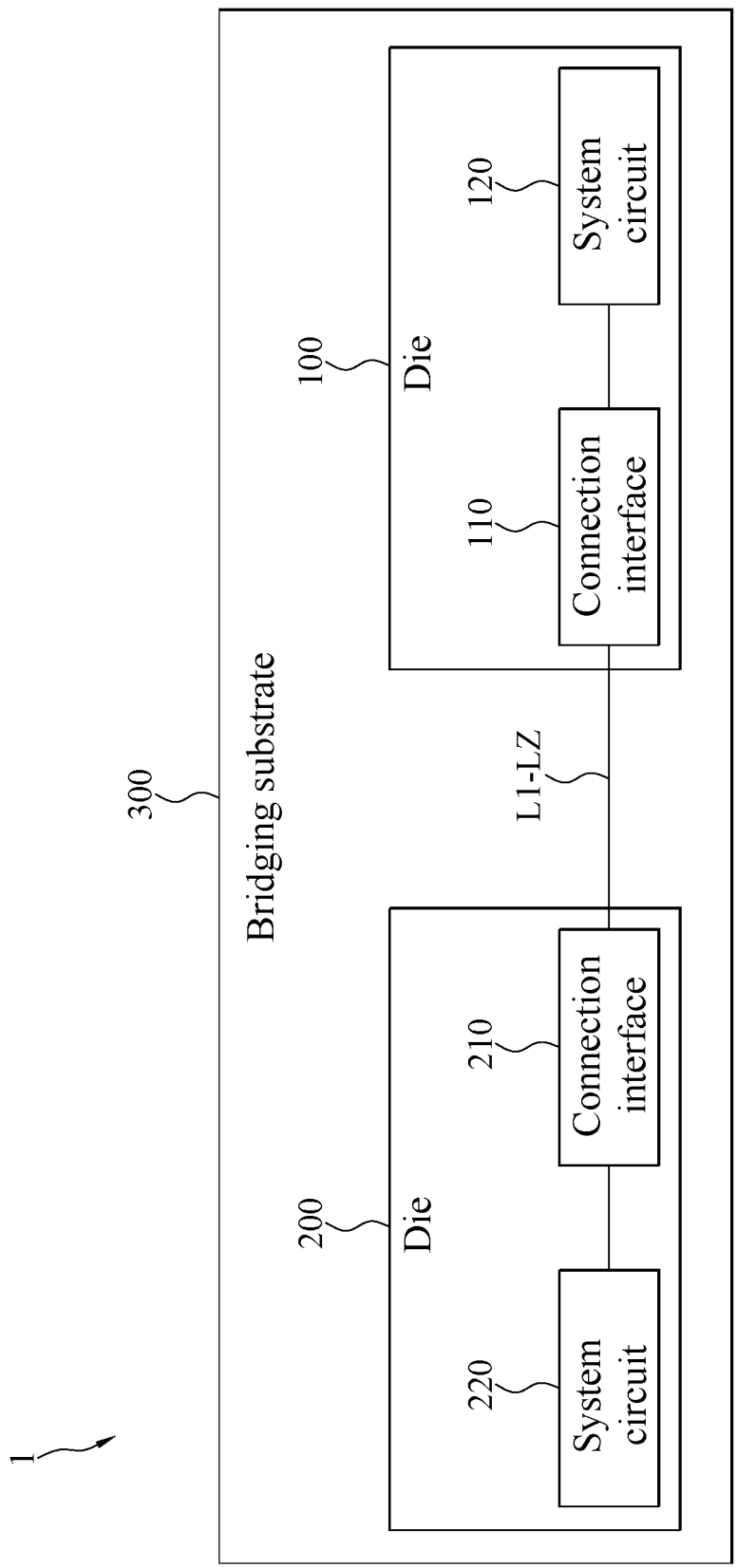
FIG. 1 illustrates a schematic block diagram of a transmission system according to an embodiment of the present disclosure.

FIG. 1 illustrates a schematic block diagram of a transmission system 1 according to an embodiment of the present disclosure. Please refer to FIG. 1. The transmission system 1 includes at least two dies (hereinafter, referred to as a die 100 and a die 200, respectively), and the die 100 is coupled to the die 200. The die 100 includes at least one connection interface 110 (hereinafter, the number of the connection interface 110 is taken as one for example, but the number of the connection interface 110 is not limited thereto) and a system circuit 120, and the system circuit 120 is coupled to the connection interface 110. The die 200 includes at least one connection interface 210 (hereinafter, the number of the connection interface 210 is taken as one for example, but the number of the connection interface 210 is not limited thereto) and a system circuit 220, and the system circuit 220 is coupled to the connection interface 210.

In some embodiments, the transmission system 1 further includes a bridging substrate 300. The die 100 and the die 200 are disposed on the bridging substrate 300, and the die 100 can be coupled to the die 200 through the bridging substrate 300. Specifically, in some embodiments, the bridging substrate 300 includes a plurality of connection lanes L1-LZ, wherein Z is a positive integer greater than one. Both of the connection interface 110 of the die 100 and the connection interface 210 of the die 200 adopt the technology of die-to-die (D2D) connection, and the connection lanes L1-LZ of the bridging substrate 300 are connected between the connection interface 110 and the connection interface 210, such that the system circuit 120 of the die 100 and the system circuit 220 of the die 200 can communicate with each other through the connection interface 110, the connection interface 210, and the connection lanes L1-LZ of the bridging substrate 300.

Figure 2:
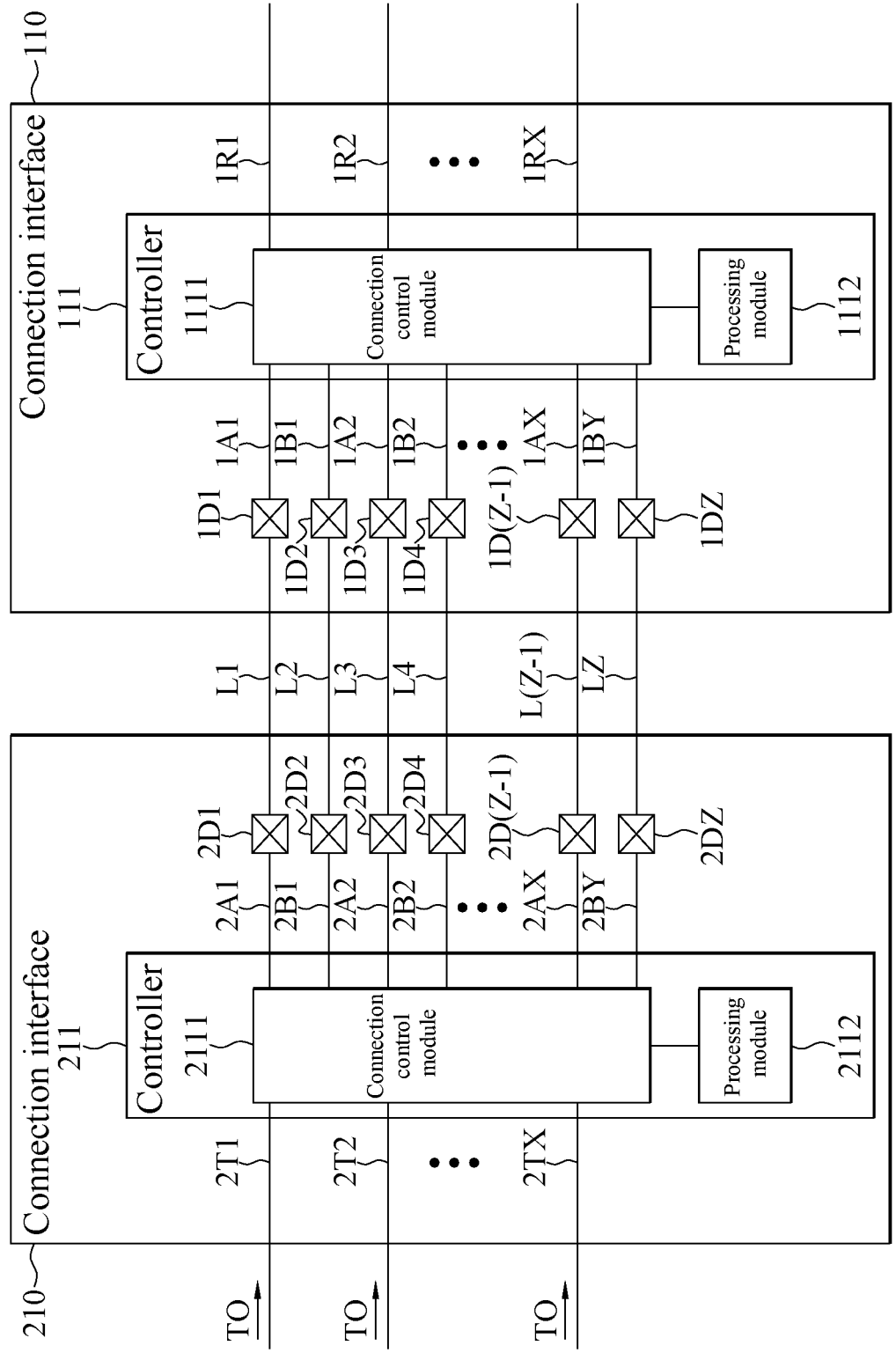
FIG. 2 illustrates a schematic block diagram of a transmission system according to an embodiment of the present disclosure.

FIG. 2 illustrates a schematic block diagram of the transmission system 1 according to an embodiment of the present disclosure. Please refer to FIG. 1 to FIG. 2. In some embodiments, the connection interface 110 includes a plurality of first usage lanes 1A1-1AX, a plurality of first spare lanes 1B1-1BY, a plurality of receiving lanes 1R1-1RX, and a controller 111. The connection interface 210 includes a plurality of second usage lanes 2A1-2AX, a plurality of second spare lanes 2B1-2BY, a plurality of outputting lanes 2T1-2TX, and a controller 211. In these embodiments, each of X and Y is a positive integer greater than one.

In some embodiments, the connection interface 110 may further include a plurality of signal contacts 1D1-1DZ, and the connection interface 210 may further include a plurality of signal contacts 2D1-2DZ. In these embodiments, Z is a positive integer greater than one, and Z is the sum of X and Y. Furthermore, the controller 111 may include a connection control module 1111 and a processing module 1112, and the controller 211 may include a connection control module 2111 and a processing module 2112.

In some embodiments, in the connection interface 110, the plurality of receiving lanes 1R1-1RX are coupled between the connection control module 1111 of the controller 111 and the system circuit 120. The plurality of first usage lanes 1A1-1AX and the plurality of first spare lanes 1B1-1BY are coupled between the connection control module 1111 of the controller 111 and the plurality of signal contacts 1D1-1DZ. Furthermore, the processing module 1112 of the controller 111 is coupled to the connection control module 1111 and the plurality of receiving lanes 1R1-1RX. In some embodiments, in the connection interface 210, the plurality of outputting lanes 2T1-2TX are coupled between the connection control module 2111 of the controller 211 and the system circuit 220. The plurality of second usage lanes 2A1-2AX and the plurality of second spare lanes 2B1-2BY are coupled between the connection control module 2111 of the controller 211 and the plurality of signal contacts 2D1-2DZ. Furthermore, the processing module 2112 of the controller 211 is coupled to the connection control module 2111.

In some embodiments, the plurality of first usage lanes 1A1-1AX and the plurality of first spare lanes 1B1-1BY of the connection interface 110 are coupled to the plurality of signal contacts 1D1-1DZ in a one-to-one relationship. The plurality of second usage lanes 2A1-2AX and the plurality of second spare lanes 2B1-2BY are coupled to the plurality of signal contacts 2D1-2DZ in a one-to-one relationship. Furthermore, the plurality of connection lanes L1-LZ of the bridging substrate 300 are coupled between the plurality of signal contacts 1D1-1DZ of the connection interface 110 and the plurality of signal contacts 2D1-2DZ of the connection interface 210 in a one-to-one relationship.

In some implementations, in an initial state, the controller 111 of the connection interface 110 can configure all the lanes coupled to the plurality of signal contacts 1D1-1DZ in a manner that the plurality of first usage lanes 1A1-1AX and the plurality of first spare lanes 1B1-1BY are arranged alternately in a one-to-one relationship. For example, as shown in FIG. 2, the lane coupled to the signal contact 1D1 is configured as the first usage lane 1A1, the lane coupled to the signal contact 1D2 is configured as the first spare lane 1B1, the lane coupled to the signal contact 1D3 is configured as the first usage lane 1A2, and so on in this order. Correspondingly, the controller 211 of the connection interface 210 also configures all the lanes coupled to the plurality of signal contacts 2D1-2DZ in a manner that the plurality of second usage lanes 2A1-2AX and the plurality of second spare lanes 2B1-2BY are arranged alternately in a one-to-one relationship. For example, as shown in FIG. 2, the lane coupled to the signal contact 2D1 is configured as the second usage lane 2A1, the lane coupled to the signal contact 2D2 is configured as the second spare lane 2B1, the lane coupled to the signal contact 2D3 is configured as the second usage lane 2A2, and so on in this order. Therefore, the first usage lane 1A1 of the connection interface 110 is coupled to the second usage lane 2A1 of the connection interface 210 through the connection lane L1, the first spare lane 1B1 of the connection interface 110 is coupled to the second spare lane 2B1 of the connection interface 210 through the connection lane L2, and so on in this order. However, the present disclosure is not limited thereto.

In some other implementations, the controller 111 of the connection interface 110 can configure all the lanes coupled to the plurality of signal contacts 1D1-1DZ in a manner that the plurality of first usage lanes 1A1-1AX and the plurality of first spare lanes 1B1-1BY are arranged alternately in a two-to-one relationship. Correspondingly, the controller 211 of the connection interface 210 can also configure all the lanes coupled to the plurality of signal contacts 2D1-2DZ in a manner that the plurality of second usage lanes 2A1-2AX and the plurality of second spare lanes 2B1-2BY are arranged alternately in a two-to-one relationship. For example, the controller 111 configures the lane coupled to the signal contact 1D1 as the first usage lane 1A1, configures the lane coupled to the signal contact 1D2 as the first usage lane 1A2, configures the lane coupled to the signal contact 1D3 as the first spare lane 1B1, and so on in this order. Correspondingly, the controller 211 configures the lane coupled to the signal contact 2D1 as the second usage lane 2A1, configures the lane coupled to the signal contact 2D2 as the second usage lane 2A2, configures the lane coupled to the signal contact 2D3 as the second spare lane 2B1, and so on in this order. Therefore, the first usage lane 1A1 of the connection interface 110 is coupled to the second usage lane 2A1 of the connection interface 210 through the connection lane L1, the first usage lane 1A2 of the connection interface 110 is coupled to the second usage lane 2A2 of the connection interface 210 through the connection lane L2, the first spare lane 1B1 of the connection interface 110 is coupled to the second spare lane 2B1 of the connection interface 210 through the connection lane L3, and so on in this order.

Figure 3:
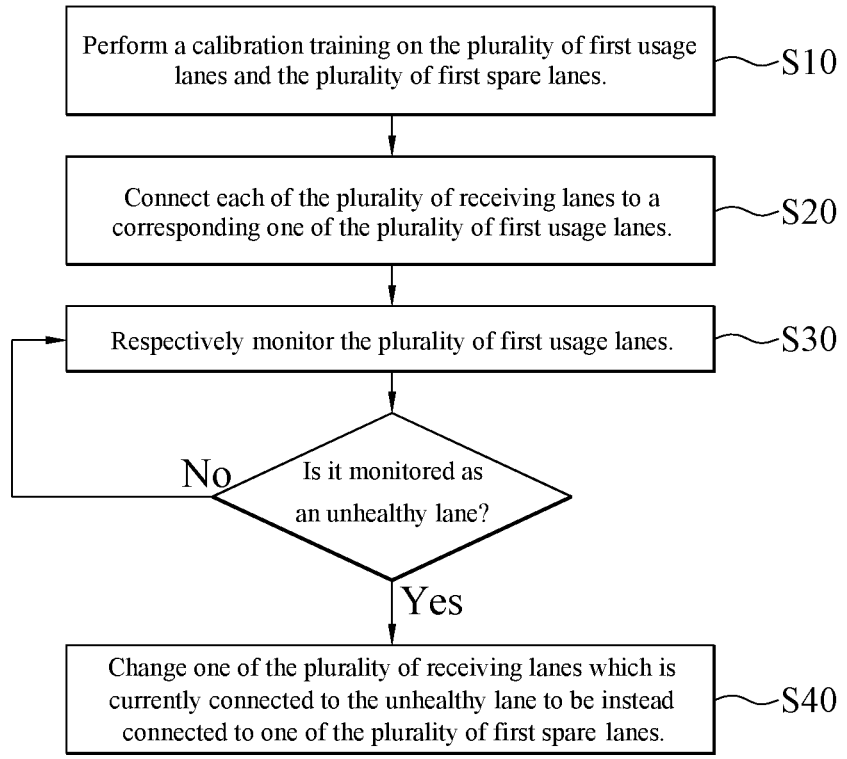
FIG. 3 illustrates a schematic flowchart of a lane connection method according to an embodiment of the present disclosure.
Figure 4:
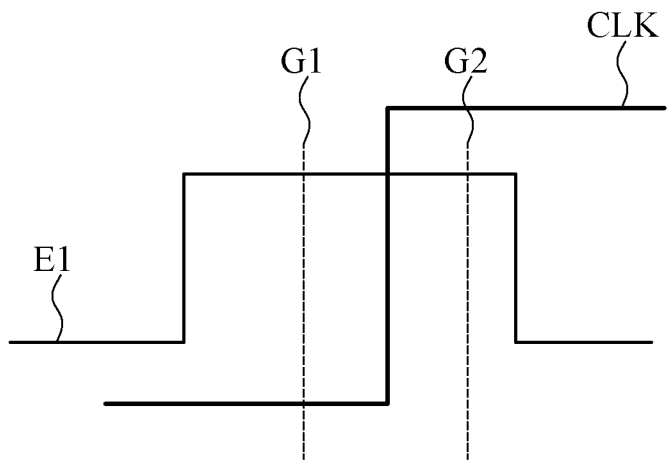
FIG. 4 illustrates a schematic view of a sampling clock and training data according to an embodiment of the present disclosure.
Figure 5:
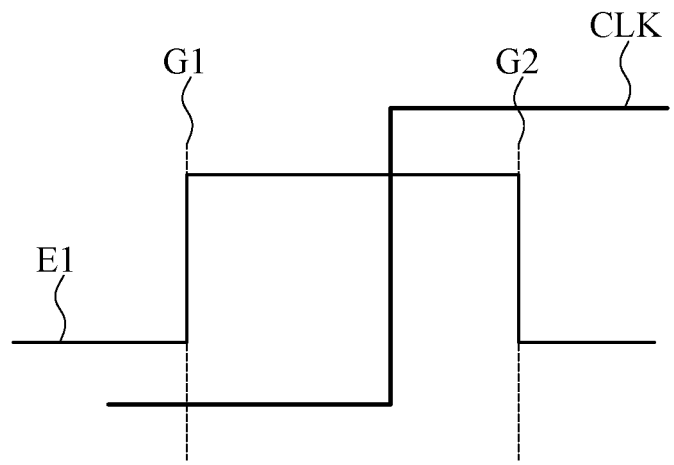
FIG. 5 illustrates a schematic view of a sampling clock and training data according to an embodiment of the present disclosure.
Figure 6:
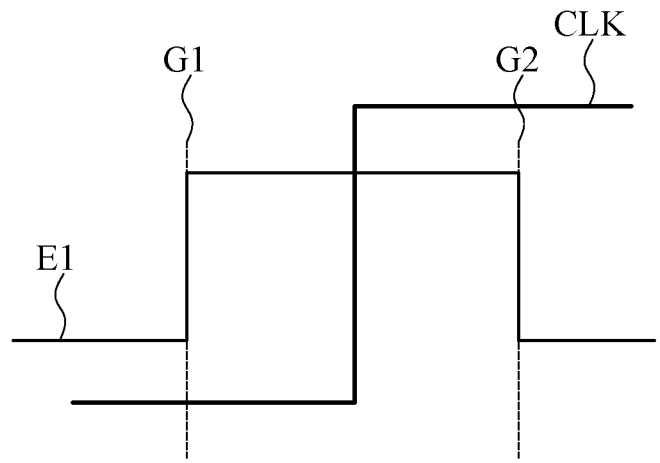
FIG. 6 illustrates a schematic view of a sampling clock and training data according to an embodiment of the present disclosure.

FIG. 3 illustrates a schematic flowchart of a lane connection method according to an embodiment of the present disclosure. Please refer to FIG. 1 to FIG. 3. The connection interface 110 and/or the connection interface 210 can perform the lane connection method according to any of the embodiments of the present disclosure. In some embodiments, before formally performing the transmission, the controller 111 can respectively perform a calibration training on the plurality of first usage lanes 1A1-1AX and the plurality of first spare lanes 1B1-1BY (step S10), such that a positive edge and/or a negative edge of a sampling clock CLK can hit (locate at) the central position in each piece of data. Specifically, in some embodiments, taking the positive edge of the sampling clock CLK to perform the calibration training on the first usage lane 1A1 as an example, training data E1 with a known data pattern, such as "010", can be transmitted on the first usage lane 1A1, and the positive edge of the sampling clock CLK hits the data "1" in the training data E1, as shown in FIG. 4. Firstly, the processing module 1112 of the controller 111 can set a left indicator G1 and a right indicator G2 respectively on the left and right sides of the positive edge of the sampling clock CLK and respectively adjust the left indicator G1 and the right indicator G2 until reaching the boundaries of the current data "1", as shown in FIG. 5. In these embodiments, the processing module 1112 can determine whether the left indicator G1 has been adjusted to the left boundary of the data "1" according to whether the data sampled at the left indicator G1 is "0", and the processing circuit 1112 can also determine whether the right indicator G2 has been adjusted to the right boundary of the data "1" according to whether the data sampled at the right indicator G2 is "0". After that, the processing circuit 1112 can realize how to adjust the positive edge of the sampling clock CLK according to a distance between the left indicator G1 and the right indicator G2, such that the positive edge of the sampling clock CLK can hit (locate at) the central position in the data "1", as shown in FIG. 6. Since the calibration training on rest of the first usage lanes 1A2-1AX and rest of the first spare lanes 1B1-1BY can be referred to the calibration training on the first usage lane 1A1 described above, detailed descriptions thereof will be omitted. Similarly, before formally performing the transmission, the controller 211 can also respectively perform a calibration training on the plurality of second usage lanes 2A1-2AX and the plurality of second spare lanes 2B1-2BY, such that a positive edge and/or a negative edge of the sampling clock CLK can hit (locate at) the central position in each piece of data. In these embodiments, since the calibration training on rest of the plurality of second usage lanes 2A1-2AX and rest of the plurality of second spare lanes 2B1-2BY can be referred to the above description, detailed descriptions thereof will be omitted.

In some embodiments, in an initial state, each of the plurality of receiving lanes 1R1-1RX corresponds to a corresponding one of the plurality of first usage lanes 1A1-1AX. For example, the receiving lane 1R1 corresponds to the first usage lane 1A1, the receiving lane 1R2 corresponds to the first usage lane 1A2, the receiving lane 1R3 corresponds to the first usage lane 1A3, and so on. Furthermore, the processing module 1112 of the controller 111 causes the connection control module 1111 to connect each of the plurality of receiving lanes 1R1-1RX to a corresponding one of the plurality of first usage lanes 1A1-1AX in a one-to-one relationship (step S20). Similarly, each of the plurality of outputting lanes 2T1-2TX of the connection interface 210 corresponds to a corresponding one of the plurality of second usage lanes 2A1-2AX. For example, the outputting lane 2T1 corresponds to the second usage lane 2A1, the outputting lane 2T2 corresponds to the second usage lane 2A2, the outputting lane 2T3 corresponds to the second usage lane 2A3, and so on. Furthermore, the processing module 2112 of the controller 211 causes the connection control module 2111 to connect each of the plurality of outputting lanes 2T1-2TX to a corresponding one of the plurality of second usage lanes 2A1-2AX in a one-to-one relationship.

In some embodiments, in response to the start of the transmission, the system circuit 220 can generate a plurality of output data TO and can output the plurality of output data TO through the plurality of outputting lanes 2T1-2TX and the plurality of second usage lanes 2A1-2AX. In these embodiments, the plurality of output data TO can be transmitted to the die 100 through the connection lanes in the bridging substrate 300 that coupled to the plurality of second usage lanes 2A1-2AX. Furthermore, the plurality of output data TO transmitted to the die 100 through the connection lanes coupled to the plurality of second usage lanes 2A1-2AX can be sequentially transmitted to the system circuit 120 through the plurality of first usage lanes 1A1-1AX and the plurality of receiving lanes 1R1-1RX.

In some embodiments, after the transmission begins, the processing module 1112 of the controller 111 in the die 100 respectively monitors the data transmission status on the plurality of first usage lanes 1A1-1AX (step S30) to determine whether each of the plurality of first usage lanes 1A1-1AX is an unhealthy lane (i.e., in these embodiments, a lane with poor data transmission status) according to the corresponding data transmission status. In some implementations, since the plurality of first usage lanes 1A1-1AX are connected to the plurality of receiving lanes 1R1-1RX at this moment, the processing module 1112 can monitor the data transmission status of each of the plurality of first usage lanes 1A1-1AX by monitoring the data transmission status of the corresponding one of the plurality of receiving lanes 1R1-1RX.

In some implementations, the processing module 1112 can simultaneously monitor the plurality of first usage lanes 1A1-1AX. In other implementations, the processing module 1112 can sequentially monitor the plurality of first usage lanes 1A1-1AX in a predetermined order.

Figure 7:
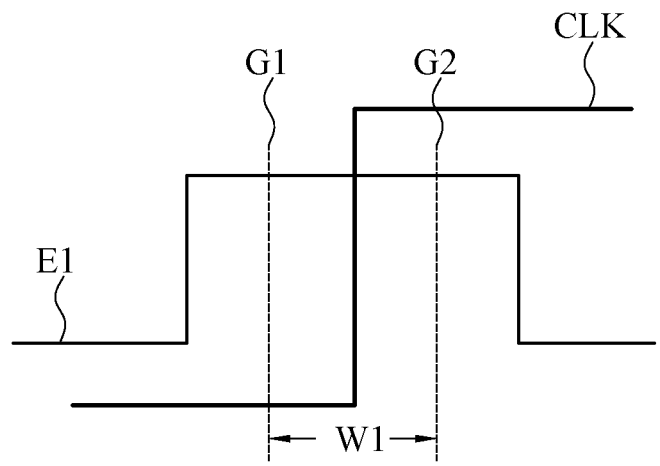
FIG. 7 illustrates a schematic view of a sampling clock and training data according to an embodiment of the present disclosure.

In some embodiments, taking the first usage lane 1A1 as the monitoring object as an example, the processing module 1112 can monitor the data transmission status of the first usage lane 1A1 through a monitoring window W1. In these embodiments, the width of the monitoring window W1 can be obtained in the previous calibration training. Specifically, in some embodiments, in the previous calibration training, after the positive edge of the sampling clock CLK has been adjusted to hit the central position of the data "1", the processing module 1112 can respectively adjust the left indicator G1 and the right indicator G2 to the boundaries of the data "1", by taking the positive edge of the sampling clock CLK as the center, to obtain a data eye. After that, the processing module 1112 takes the positive edge of the sampling clock CLK as the center to respectively adjust the positions of the left indicator G1 and the right indicator G2 according to the data eye so as to set the width of the monitoring window W1, as shown in FIG. 7. For example, in response to that the data eye obtained in the previous calibration training is 100 picoseconds (ps), the processing module 1112 can respectively adjust the left indicator G1 and the right indicator G2 to the positions that are 20 ps (i.e., ¼ data eye) apart from the positive edge of the sampling clock CLK, thus allowing the width of the monitoring window W1 (i.e., the distance between the left indicator G1 and the right indicator G2) to be 40 ps.

During the monitoring, the processing module 1112 can use the left indicator G1, the sampling clock CLK, and the right indicator G2 to respectively sample the data on the first usage lane 1A1, and the processing module 1112 can also determine the data transmission status of the first usage lane 1A1 according to whether the data sampled by the left indicator G1 is the same as the data sampled by the sampling clock CLK and whether the data sampled by the sampling clock CLK is the same as the data sampled by the right indicator G2.

Specifically, in some embodiments, the processing module 1112 can use an XOR gate to determine whether the data sampled by the left indicator G1 is the same as the data sampled by the sampling clock CLK, and the processing module 1112 can also use another XOR gate to determine whether the data sampled by the sampling clock CLK is the same as the data sampled by the right indicator G2. In the case that the outputs of the two XOR gates are both logic "0", it represents that the data transmission status of the first usage lane 1A1 is good. In the case that any of the outputs of the two XOR gates is logic "1", it represents that the data transmission status of the first usage lane 1A1 has the problem of data deviation or narrowing, and the processing module 1112 will determine that the first usage lane 1A1 is an unhealthy lane. Moreover, in the case that the XOR gate which is used to determine whether the data sampled by the left indicator G1 is the same as the data sampled by the sampling clock CLK outputs "0" and the XOR gate which is used to determine whether the data sampled by the sampling clock CLK is the same as the data sampled by the right indicator G2 outputs "1", it represents that the data has been moved forward; in the case that the XOR gate which is used to determine whether the data sampled by the left indicator G1 is the same as the data sampled by the sampling clock CLK outputs "1" and the XOR gate which is used to determine whether the data sampled by the sampling clock CLK is the same as the data sampled by the right indicator G2 outputs "0", it represents that the data has been moved backward; and in the case that the XOR gate which is used to determine whether the data sampled by the left indicator G1 is the same as the data sampled by the sampling clock CLK outputs "1" and the XOR gate which is used to determine whether the data sampled by the sampling clock CLK is the same as the data sampled by the right indicator G2 outputs "1", it represents that the data narrowing has occurred.

It should be noted that, the data transmission status of the each of the plurality of first usage lanes 1A1-1AX at this moment also represents the data transmission status of the connection lane connected to the each of the plurality of first usage lanes 1A1-1AX. Therefore, in the case that a first usage lane, for example, the first usage lane 1A1 is determined as an unhealthy lane, it represents that the connection lane L1 connected to the first usage lane 1A1 is also an unhealthy lane (i.e., the problems such as transmission attenuation or even damage may have occurred on the connection lane L1). Since the monitoring performed on rest of the first usage lanes 1A2-1AX can be referred to the monitoring performed on the first usage lane 1A1, detailed descriptions thereof will also be omitted.

In some embodiments, in response to that a first usage lane, for example, the first usage lane 1A1 is monitored as an unhealthy lane (i.e., in these embodiments, a lane with poor data transmission status) by the processing module 1112 of the connection interface 110, the processing module 1112 can set the first usage lane 1A1 to be an unhealthy lane (for example but not limited to, set the status of the first usage lane 1A1 in a lane status table from a healthy status to an unhealthy status), and the processing module 1112 can also cause the connection control module 1111 to change the receiving lane which is currently connected to the unhealthy lane (i.e., the receiving lane 1R1 connected to the first usage lane 1A1) to be instead connected to one of the plurality of first spare lanes 1B1-1BY (step S40). In this way, the data (such as the output data TO or the input data described below) can be switched from being transmitted on the first usage lane 1A1 with poor data transmission status to the first spare lane with better data transmission status (in this example, the output data TO of the die 200 can be transmitted to the die 100 by switching from being transmitted on the connection lane L1 with poor data transmission status to another connection lane with better data transmission status), such that the data transmission quality can be improved. Furthermore, due to the monitoring of the data transmission status of each first usage lane, the connection lane that is about to be damaged can be found out in advance, and the data can be switched from being transmitted on the connection lane that is about to be damaged and the first usage lane connected thereto to another connection lane and the first spare lane connected thereto, thereby the data transmission between the die 100 and the die 200 will not be interrupted due to the damage of the connection lane, and the high-speed transmission of the transmission system 1 can be maintained. In some implementations, the transmission speed can reach at least 12G bps.

In some embodiments, each of the plurality of receiving lanes 1R1-1RX of the connection interface 110 may correspond to at least one dedicated first spare lane, and the at least one first spare lane corresponding to each of the plurality of receiving lanes 1R1-1RX is different from each other. Taking that each of the plurality of receiving lanes 1R1-1RX corresponds to a corresponding one of the plurality of first spare lanes 1B1-1BY in a one-to-one relationship for example, in the example, the receiving lane 1R1 corresponds to the first spare lane 1B1, the receiving lane 1R2 corresponds to the first spare lane 1B2, the receiving lane 1R3 corresponds to the first spare lane 1B3, and so on. Correspondingly, each of the plurality of outputting lanes 2T1-2TX of the connection interface 210 may corresponds to at least one dedicated second spare lane, and the at least one second spare lane corresponding to each of the plurality of outputting lanes 2T1-2TX is different from each other. Taking that each of the plurality of outputting lanes 2T1-2TX corresponds to a corresponding one of the plurality of second spare lanes 2B1-2BY in a one-to-one relationship for example, in the example, the outputting lane 2T1 corresponds to the second spare lane 2B1, the outputting lane 2T2 corresponds to the second spare lane 2B2, the outputting lane 2T3 corresponds to the second spare lane 2B3, and so on.

Figure 8:
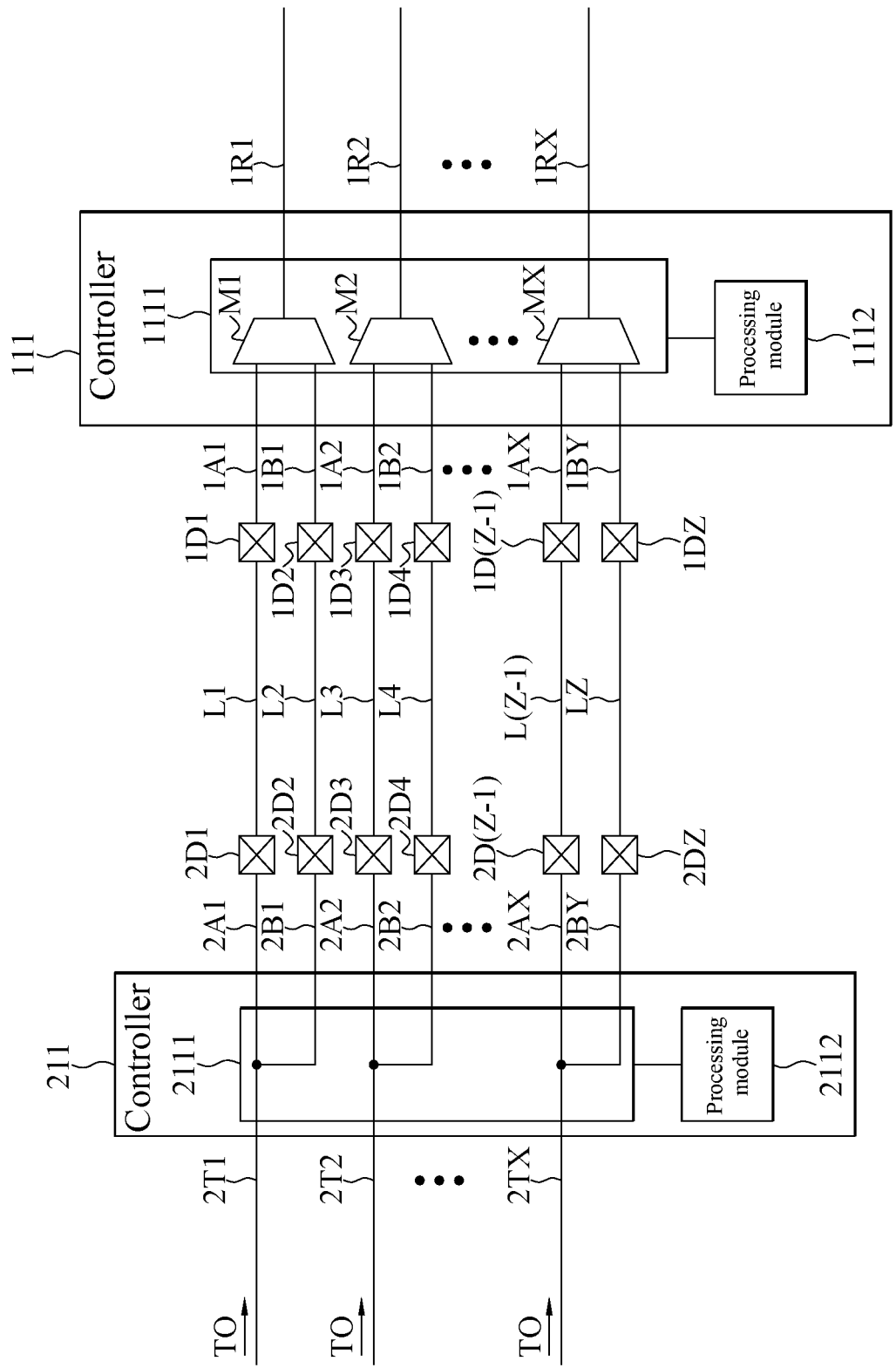
FIG. 8 illustrates a schematic block diagram of a transmission system according to an embodiment of the present disclosure.

In some embodiments, the connection control module 2111 of the connection interface 210 can directly connect each of the plurality of outputting lanes 2T1-2TX to the corresponding one of the plurality of second usage lanes 2A1-2AX and the at least one dedicated second spare lane. Taking that each of the plurality of outputting lanes 2T1-2TX corresponds to a corresponding one dedicated second spare lane for example, in the example, as shown in FIG. 8, the outputting lane 2T1 may be connected to the second usage lane 2A1 and the second spare lane 2B1, the outputting lane 2T2 may be connected to the second usage lane 2A2 and the second spare lane 2B2, the outputting lane 2T3 may be connected to the second usage lane 2A3 and the second spare lane 2B3, and so on. That is, in these embodiments, the output data TO on each of the plurality of outputting lanes 2T1-2TX of the connection interface 200 has two transmission paths: one transmission path is that the output data TO is transmitted through the second usage lane connected to this outputting lane, and then transmitted to the first usage lane in the connection interface 110 connected to this connection lane through the connection lane in the bridging substrate 300 connected to this second usage lane; and the other transmission path is that the output data TO is transmitted through the second spare lane connected to this outputting lane, and then transmitted to the first spare lane in the connection interface 110 connected to this connection lane through the connection lane in the bridging substrate 300 connected to this second spare lane. In other words, in some embodiments, each of the plurality of first usage lanes 2A1-2AX and the dedicated first spare lane thereof of the connection interface 110 can receive the output data TO output from the same outputting lane in the connection interface 210.

Furthermore, the connection control module 1111 of the connection interface 110 may include a plurality of multiplexers M1-MX, and each of the plurality of multiplexers M1-MX corresponds to a corresponding one of the plurality of receiving lanes 1R1-1RX. In these embodiments, each of the plurality of multiplexers M1-MX is coupled to the corresponding one of the plurality of receiving lanes 1R1-1RX, and is also coupled between the first usage lane and the first spare lane which correspond to the corresponding one of the plurality of receiving lanes 1R1-1RX. For example, as shown in FIG. 8, two input terminals of the multiplexer M1 are respectively coupled to the first usage lane 1A1 and the first spare lane 1B1, and the output terminal of the multiplexer M1 is coupled to the receiving lane 1R1; two input terminals of the multiplexer M2 are respectively coupled to the first usage lane 1A2 and the first spare lane 1B2, and the output terminal of the multiplexer M2 is coupled to the receiving lane 1R2; and so on. In this embodiment, in the initial state, the processing module 1112 causes the plurality of multiplexers M1-MX to connect the plurality of receiving lanes 1R1-1RX to the plurality of first usage lanes 1A1-1AX. Furthermore, the processing module 1112 causes the multiplexer which is currently connected to the unhealthy lane to change the receiving lane connected to the multiplexer to be instead connected to the corresponding first spare lane in the step S40. Taking the first usage lane 1A3 serving as the unhealthy lane for example, the processing module 1112 causes the multiplexer M3 to switch the connection in the step S40, such that the receiving lane 1R3 which is currently connected to the first usage lane 1A3 is changed to be instead connected to the dedicated first spare lane 1B3. As a result, the receiving lane 1R3 can receive, through the first spare lane 1B3 instead of the first usage lane 1A3, the output data TO output by the outputting lane 2T3 in the connection interface 210 through the connection lane L6.

Figure 9:
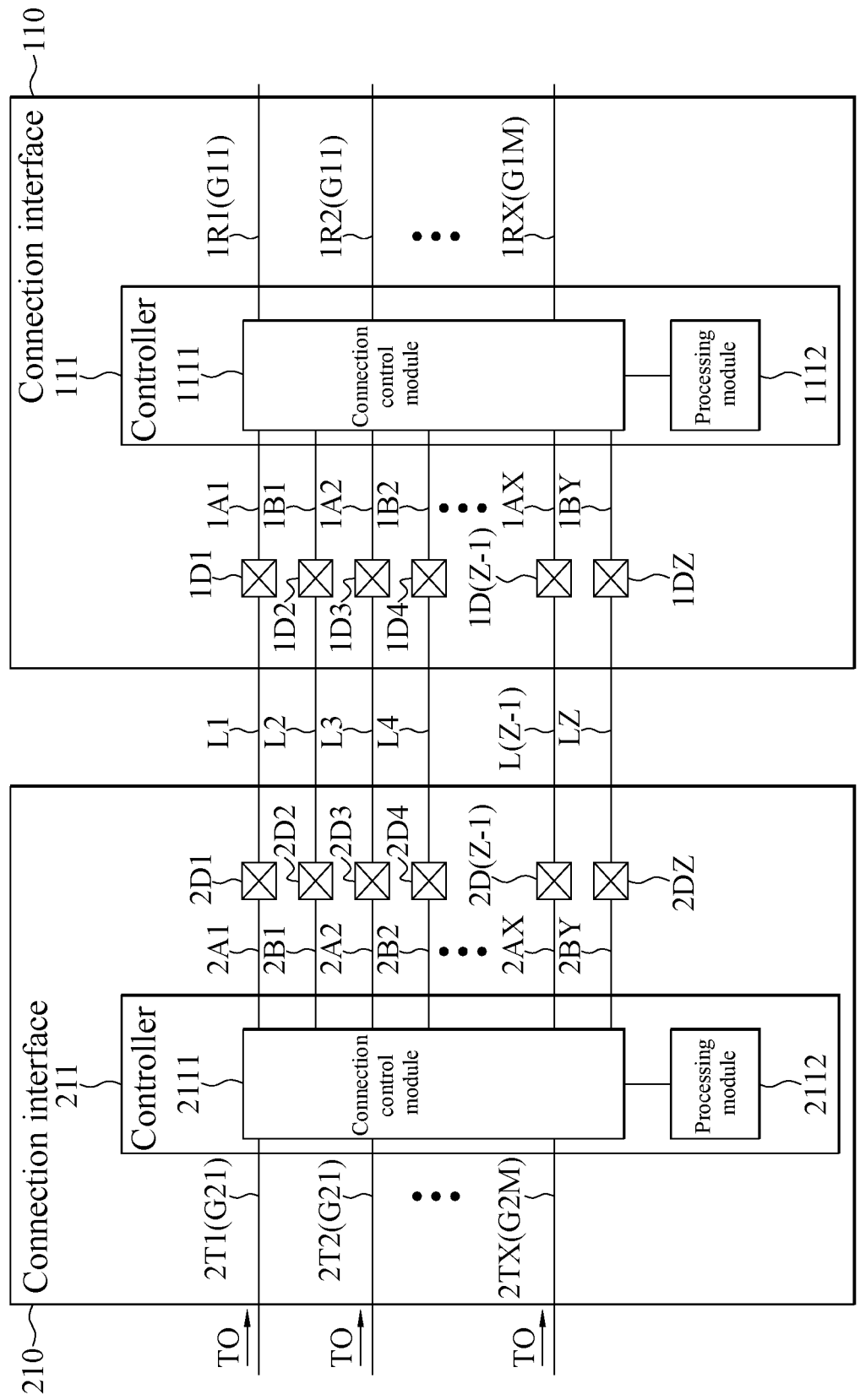
FIG. 9 illustrates a schematic block diagram of a transmission system according to an embodiment of the present disclosure.

In some embodiments, as shown in FIG. 9, in the connection interface 110, each of the plurality of receiving lanes 1R1-1RX corresponds to a corresponding one of the first plurality of usage lanes 1A1-1AX, and the plurality of receiving lanes 1R1-1RX may be divided into a plurality of receiving lane groups G11-G1M. In these embodiments, each of the plurality of receiving lane groups G11-G1M includes at least two receiving lanes, and each of the plurality of receiving lane groups G11-G1M may correspond to at least one first spare lane. In other words, in these embodiments, the at least one first spare lane corresponding to the same receiving lane group will be shared by the receiving lanes in this receiving lane group. Correspondingly, in the connection interface 210, each of the plurality of outputting lanes 2T1-2TX corresponds to a corresponding one of the plurality of second usage lanes 2A1-2AX, and the plurality of outputting lanes 2T1-2TX may be divided into a plurality of outputting lane groups G21-G2M. In these embodiments, each of the plurality of outputting lane groups G21-G2M includes at least two outputting lanes, and each of the plurality of outputting lane groups G21-G2M may correspond to at least one second spare lane. In other words, in these embodiments, the at least one second spare lane corresponding to the same outputting lane group will be shared by the outputting lanes in this outputting lane group. Furthermore, each of the plurality of receiving lane groups G11-G1M may correspond to a corresponding one of the plurality of outputting lane groups G21-G2M. In these embodiments, the number of the receiving lanes included in each of the plurality of receiving lane groups G11-G1M is the same as the number of the outputting lanes included in the corresponding one of the plurality of outputting lane groups G21-G2M, and the number of the first spare lanes corresponding to each of the plurality of receiving lane groups G11-G1M is the same as the number of the second spare lanes corresponding to the corresponding one of the plurality of outputting lane groups G21-G2M.

As an example, each of the plurality of receiving lane groups G11-G1M includes three receiving lanes and corresponds to two first spare lanes, and each of the plurality of outputting lane groups G21-G2M includes three outputting lanes and corresponds to two second spare lanes. In the example, the receiving lane group G11 may include the receiving lanes 1R1, 1R2, and 1R3 and corresponds to the first spare lanes 1B1 and 1B2, the receiving lane group G12 may include the receiving lanes 1R4, 1R5, and 1R6 and corresponds to the first spare lanes 1B3 and 1B4, and so on. Correspondingly, the outputting lane group G21 may include the outputting lanes 2T1, 2T2, and 2T3 and corresponds to the second spare lanes 2B1 and 2B2, the outputting lane group G22 may include the outputting lanes 2T4, 2T5, and 2T6 and corresponds to the second spare lanes 2B3 and 2B4, and so on.

Figure 10:
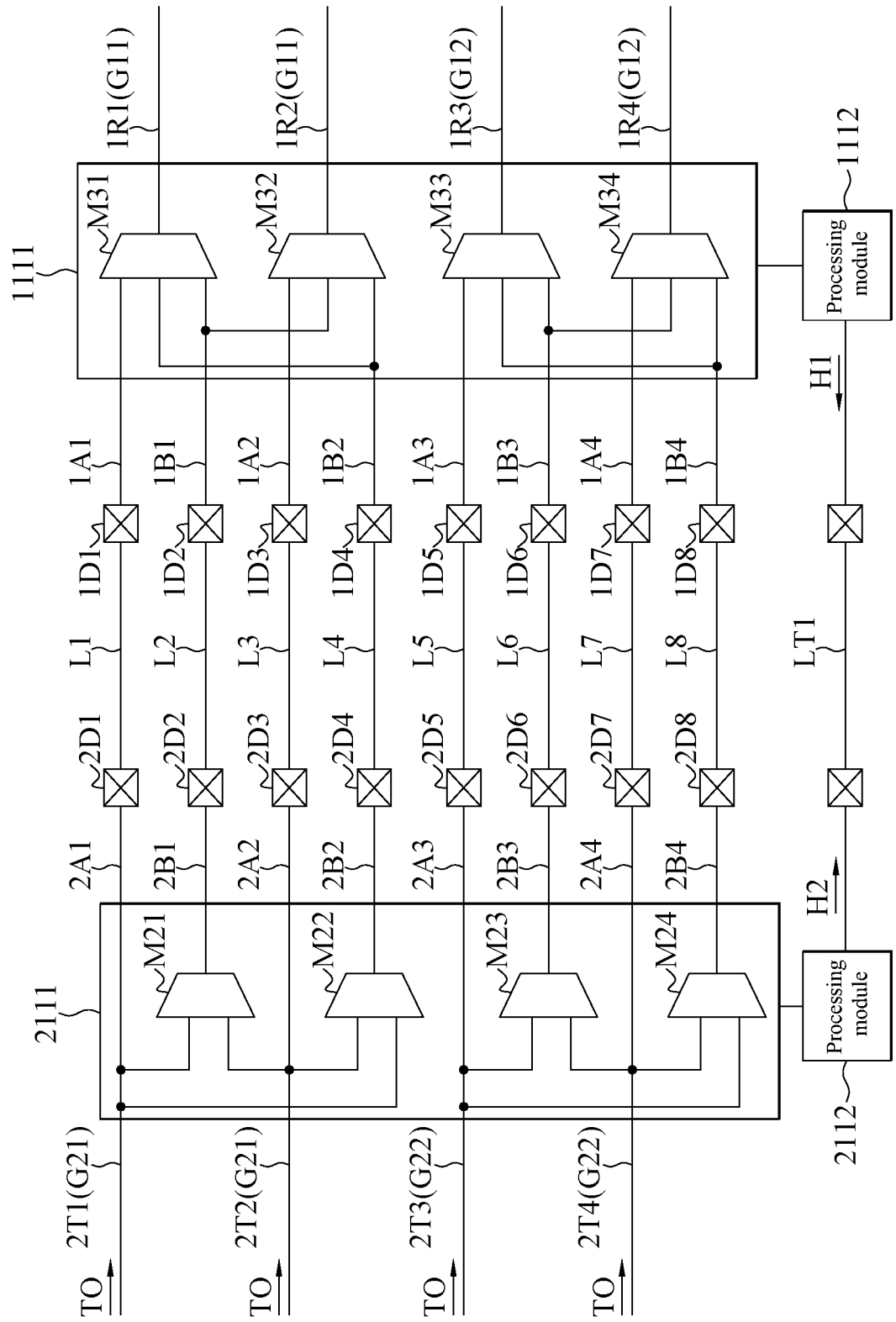
FIG. 10 illustrates a schematic block diagram of a transmission system according to an embodiment of the present disclosure.

FIG. 10 illustrates a schematic block diagram of the transmission system 1 according to an embodiment of the present disclosure. Please refer to FIG. 1, FIG. 3, and FIG. 10. In an embodiment, the connection interface 110 including four receiving lanes 1R1-1R4, four first usage lanes 1A1-1A4, and four first spare lanes 1B1-1B4, and the connection interface 210 including four outputting lanes 2T1-2T4, four second usage lanes 2A1-2A4, and four second spare lanes 2B1-2B4 are taken as an example for explanation.

In the connection interface 110, the receiving lane group G11 may include the receiving lanes 1R1 and 1R2 and correspond to the first spare lanes 1B1 and 1B2, and the receiving lane group G12 may include the receiving lanes 1R3 and 1R4 and corresponds to the first spare lanes 1B3 and 1B4. Furthermore, the connection control module 1111 may include four 3-to-1 multiplexers M31-M34. In this embodiment, the input side of the 3-to-1 multiplexer M31 is coupled to the first usage lane 1A1 and the first spare lanes 1B1 and 1B2, and the output side of the 3-to-1 multiplexer M31 is coupled to the receiving lane 1R1; the input side of the 3-to-1 multiplexer M32 is coupled to the first usage lane 1A2 and the first spare lanes 1B1 and 1B2, and the output side of the 3-to-1 multiplexer M32 is coupled to the receiving lane 1R2; the input side of the 3-to-1 multiplexer M33 is coupled to the first usage lane 1A3 and the first spare lanes 1B3 and 1B4, and the output side of the 3-to-1 multiplexer M33 is coupled to the receiving lane 1R3; the input side of the 3-to-1 multiplexer M34 is coupled to the first usage lane 1A4 and the first spare lanes 1B3 and 1B4, and the output side of the 3-to-1 multiplexer M34 is coupled to the receiving lane 1R4.

In the connection interface 210, the outputting lane group G21 may include the outputting lanes 2T1 and 2T2 and corresponds to the second spare lanes 2B1 and 2B2, and the outputting lane group G22 may include the outputting lanes 2T3 and 2T4 and corresponds to the second spare lanes 2B3 and 2B4. In this embodiment, the connection control module 2111 directly connects the outputting lane 2T1 to the second usage lane 2A1, directly connects the outputting lane 2T2 to the second usage lane 2A2, directly connects the outputting lane 2T3 to the second usage lane 2A3, and directly connects the outputting lane 2T4 to the second usage lane 2A4. Furthermore, the connection control module 2111 may include four 2-to-1 multiplexers M21-M24. In this embodiment, the input sides of the 2-to-1 multiplexers M21 and M22 are both coupled to the outputting lanes 2T1 and 2T2, the output side of the 2-to-1 multiplexer M21 is coupled to the second spare lane 2B1, and the output side of the 2-to-1 multiplexer M22 is coupled to the second spare lane 2B2; and the input sides of the 2-to-1 multiplexers M23 and M24 are both coupled to the outputting lanes 2T3 and 2T4, the output side of the 2-to-1 multiplexer M23 is coupled to the second spare lane 2B3, and the output side of the 2-to-1 multiplexer M24 is coupled to the second spare lane 2B4.

In an initial state, in the connection interface 110, the processing module 1112 causes the 3-to-1 multiplexer M31 to connect the receiving lane IR1 to the first usage lane 1A1, the processing module 1112 causes the 3-to-1 multiplexer M32 to connect the receiving lane 1R2 to the first usage lane 1A2, the processing module 1112 causes the 3-to-1 multiplexer M33 to connect the receiving lane 1R3 to the first usage lane 1A3, and the processing module 1112 causes the 3-to-1 multiplexer M34 to connect the receiving lane 1R4 to the first usage lane 1A4. In this way, the output data TO on the outputting lane 2T1 of the connection interface 210 will be sequentially transmitted to the receiving lane 1R1 through the second usage lane 2A1, the connection lane L1, and the first usage lane 1A1; the output data TO on the outputting lane 2T2 of the connection interface 210 will be sequentially transmitted to the receiving lane 1R2 through the second usage lane 2A2, the connection lane L3, and the first usage lane 1A2; the output data TO on the outputting lane 2T3 of the connection interface 210 will be sequentially transmitted to the receiving lane 1R3 through the second usage lane 2A3, the connection lane L5, and the first usage lane 1A3; and the output data TO on the outputting lane 2T4 of the connection interface 210 will be sequentially transmitted to the receiving lane 1R4 through the second usage lane 2A4, the connection lane L7, and the first usage lane 1A4.

After that, in the case that the first usage lane 1A1 is monitored as an unhealthy lane by the processing module 1112 in the connection interface 110, the processing module 1112 generates an output replacement request H1 and transmits the output replacement request H1 to the connection interface 210 through a communication lane LT1 in the bridging substrate 300, wherein the communication lane LT1 is connected between the connection interface 110 and the connection interface 210. In response to that the processing module 2112 in the connection interface 210 receives the output replacement request H1, the processing module 2112 can realize, according to the output replacement request H1, that the output path of the outputting lane 2T1 should be changed accordingly. Therefore, the processing module 2112 will select to cause the 2-to-1 multiplexer M21 to connect the outputting lane 2T1 to the second spare lane 2B1 or cause the 2-to-1 multiplexer M22 to connect the outputting lane 2T1 to the second spare lane 2B2. In this embodiment, the processing module 2112 can make the selection according to a predetermined arbitration setting (the predetermined arbitration setting may be, but not limited to, implemented through an arbiter). In response to that the processing module 2112 selects to cause the 2-to-1 multiplexer M22 to connect the outputting lane 2T1 to the second spare lane 2B2, the processing module 2112 further generates an input replacement command H2 according to the second spare lane 2B2 and transmits the input replacement command H2 to the connection interface 110 through the communication lane LT1 in the bridging substrate 300. After the processing module 1112 of the connection interface 110 receives the input replacement command H2, the processing module 1112 can realize that the output data TO on the outputting lane 2T1 will change to be transmitted through the second spare lane 2B2 and the connection lane L4, thus, the processing module 1112 will cause the 3-to-1 multiplexer M31 to change the receiving lane IRI which is currently connected to the first usage lane 1A1 to be connected to the first spare lane 1B1. Since the connection switching of the receiving lanes 1R2-1R4 can be referred to the connection switching of the receiving lane 1R1 described above, detailed descriptions thereof will be omitted.

Figure 11:
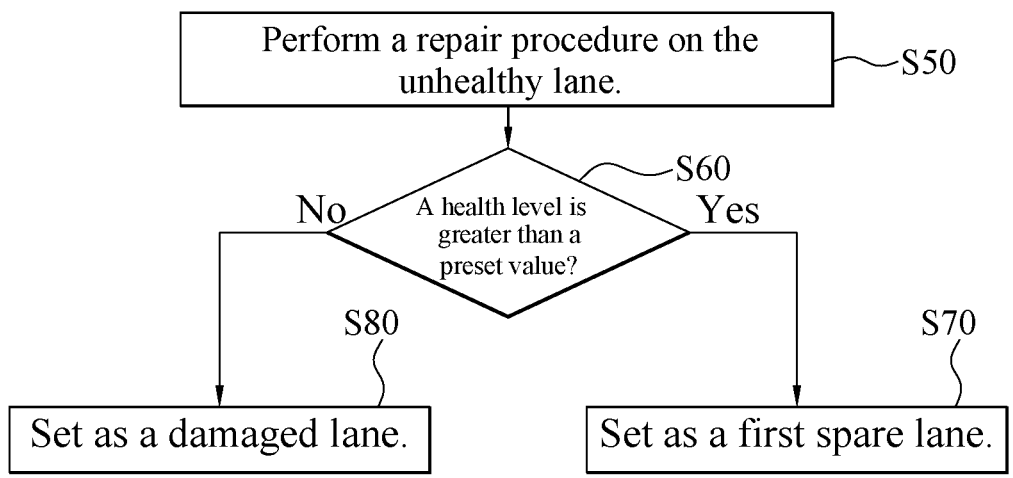
FIG. 11 illustrates a schematic partial flowchart of a lane connection method according to an embodiment of the present disclosure.

FIG. 11 illustrates a schematic partial flowchart of a lane connection method according to an embodiment of the present disclosure. Please refer to FIG. 1 to FIG. 11. In some embodiments, in the connection interface 210, the processing module 2112 of the controller 211 can receive the plurality of output data TO from the system circuit 220 through the plurality of outputting lanes 2T1-2TX, and the processing module 2112 can also generate input data according to the output data TO on the at least one of the outputting lanes (such as the output data TO on the outputting lane 2T1) and testing data. After that, the processing module 2112 transmits, through the second usage lane 2A1 and/or the second spare lane that are connected to the outputting lane 2T1 plus and the connection lanes connected to the second usage lane 2A1 and/or the second spare lane, the input data to the first usage lane 1A1 or the first spare lane that is connected to the receiving lane IRI in the connection interface 110. In this embodiment, the testing data can be the data used to repair the unhealthy lane(s). In some implementations, the processing module 2112 can generate at least one piece of required testing data through a pattern generator, and the processing module 2112 can insert each piece of the testing data into the output data TO to form the input data. For example, a piece of testing data is inserted into the output data TO every 1 nanosecond (ns). In this way, in the connection interface 110, after the processing module 1112 of the controller 111 receives the input data through the receiving lane 1R1, in response to that the portion of the input data that is read by the processing module 1112 is the testing data, the processing module 1112 can perform a repair procedure on all the lanes that are set as unhealthy lanes according to the testing data (step S50).

After the repair procedure is performed, the processing module 1112 of the controller 111 determines whether a health level of an unhealthy lane after the repair procedure has been performed is greater than a preset value (step S60). In response to that the processing module 1112 determines that the health level is greater than the preset value, it indicates that the repair procedure is successful, and the processing module 1112 can set this unhealthy lane as a first spare lane (step S70). On the contrary, in response to that the processing module 1112 determines that the health level is less than or equal to the preset value, it indicates that the repair procedure is failed, and the processing module 1112 can set this unhealthy lane as a damaged lane (step S80). In these embodiments, once a lane is set as a damaged lane, the processing module 1112 will no longer perform any repair procedure on this lane.

Specifically, in some embodiments, taking that performing a repair procedure on an unhealthy lane, such as the first usage lane 1A1 as an example, first, according to the testing data with a known data pattern, such as "010", the processing module 1112 of the controller 111 can respectively re-adjust the left indicator G1 and the right indicator G2 to the boundaries of the data, for example, the data "1". After that, the processing module 1112 adjusts the positive edge of the sampling clock CLK according to the distance between the left indicator G1 and the right indicator G2, such that the positive edge of the sampling clock CLK can hit (locate at) the central position in the data "1". In these embodiments, the repair procedure is almost the same as the aforementioned calibration training. In other words, in these embodiments, performing a repair procedure on an unhealthy lane is equivalent to re-performing the calibration training on the unhealthy lane.

Next, the processing module 1112 respectively adjusts the left indicator G1 and the right indicator G2 to the boundaries of the current data "1" by taking the positive edge of the sampling clock CLK as the center to obtain the value of the current data eye. After that, the processing module 1112 compares the current data eye with a preset value, such as ½ of the original data eye (i.e., the original data eye of the testing data). In the case that the current data eye is greater than the ½ of the original data eye, the processing module 1112 can set the first usage lane 1A1 from the unhealthy lane to a healthy lane, such that the first usage lane 1A1 can be served as a spare lane. For example, in a lane status table, a status value corresponding to the first usage lane 1A1 is changed from a second value to a first value, wherein the first value represents that this lane is a healthy lane, and the second value represents that this lane is an unhealthy lane. In the case that the current data eye is less than or equal to the ½ of the original data eye, the processing module 1112 can set the first usage lane 1A1 from the unhealthy lane to a damaged lane. For example, the first usage lane 1A1 is registered in a damaged lane table.

In some embodiments, the connection interface 110 may be referred to as a receiving interface, and the connection interface 210 may be referred to as a transmitting interface.

In some embodiments, the die 100 may further include a connection interface 210 in addition to the connection interface 110. Correspondingly, the die 200 may further include a connection interface 110 in addition to the connection interface 210. Furthermore, the connection interface 210 of the die 100 may be connected to the connection interface 110 of the die 200 through another group of connection lanes L1-LZ of the bridging substrate 300 for communication. In other words, in some embodiments, each die may include a receiving interface and a transmitting interface, and the receiving interface of one die may be connected to the transmitting interface of another die through a group of connection lanes L1-LZ.

In some embodiments, in the die 100, the processing module 1112 of the connection interface 110 and the processing module 2112 of the connection interface 210 may be integrated into a single processing module. In some implementations, the processing module 1112 and/or the processing module 2112 may be implemented by using an embedded controller (EC), a system on chip (SoC), a central processing unit (CPU), a microprocessor (MCU), an application specific integrated circuit (ASIC), an application processor (AP), a digital signal processor (DSP), a programmable logic device (PLD), or any suitable electronic components.

To sum up, according to one or some embodiments of the present disclosure, the connection interface 110/210, and the lane connection method thereof adapted for die-to-die can monitor the data transmission status of each of the plurality of first usage lanes 1A1-1AX connected to the plurality of receiving lanes 1R1-1RX. In response to that any of the plurality of first usage lanes 1A1-1AX is monitored as an unhealthy lane, one of the plurality of receiving lanes 1R1-1RX which is currently connected to the unhealthy lane is changed to be instead connected to one of the plurality of first spare lanes 1B1-1BY. In this way, the data can be switched from being transmitted on the first usage lane with poor data transmission status to the first spare lane with better data transmission status, thereby improving the data transmission quality. Furthermore, due to the monitoring of the data transmission status of each first usage lane, a processing module 1112/2112 of the connection interface 110/210 can find out the connection lane that is about to be damaged in the bridging substrate 300 in advance, and the processing module 1112/2112 then changes to use another connection lane and the first spare lane for transmission. Therefore, the data transmission between the dies 100 and 200 will not be interrupted due to the damage of the connection lane, and the high-speed transmission of the transmission system 1 can be maintained.

Although the present disclosure has been described in considerable detail with reference to certain preferred embodiments thereof, the disclosure is not for limiting the scope of the application. Persons having ordinary skill in the art may make various modifications and changes without departing from the scope and spirit of the present disclosure. Therefore, the scope of the appended claims should not be limited to the description of the preferred embodiments described above.

What is claimed is:

1. A connection interface adapted for die-to-die, comprising:
   a plurality of first usage lanes;
   a plurality of first spare lanes;
   a plurality of receiving lanes; and
   a controller configured to connect each of the plurality of receiving lanes to a corresponding one of the plurality of first usage lanes and to respectively monitor the plurality of first usage lanes, wherein in response to that any of the plurality of first usage lanes is monitored, by the controller, as an unhealthy lane, the controller changes one of the plurality of receiving lanes which is currently connected to the unhealthy lane to be instead connected to one of the plurality of first spare lanes;
   wherein in response to that the controller receives input data through any of the plurality of first usage lanes or any of the plurality of first spare lanes, the controller further performs a repair procedure on the unhealthy lane according to testing data in the input data, and the controller determines whether a health level of the unhealthy lane is greater than a preset value, where the health level is obtained after the repair procedure is performed, and wherein the controller changes to serve the unhealthy lane as the one of the plurality of first spare lanes in response to that the controller determines that the health level of the unhealthy lane is greater than the preset value.

2. The connection interface adapted for die-to-die according to claim 1, further comprising:
   a plurality of second usage lanes;
   a plurality of second spare lanes; and
   a plurality of output lanes, wherein each of the plurality of output lanes is connected to a corresponding one of the plurality of second usage lanes and at least one of the plurality of second spare lanes.

3. The connection interface adapted for die-to-die according to claim 1, further comprising:
   a plurality of second usage lanes;
   a plurality of second spare lanes; and
   a plurality of output lanes, wherein each of the plurality of output lanes is connected to a corresponding one of the plurality of second usage lanes, and each of the plurality of output lanes corresponds to at least one of the plurality of second spare lanes; and
   wherein, in response to that the controller receives an output replacement request from another connection interface, the controller changes one of the plurality of output lanes which is currently connected to the corresponding one of the plurality of second usage lanes and corresponds to the output replacement request to be instead connected to one of the at least one of the plurality of second spare lanes corresponding to the one of the plurality of output lanes, and the controller further generates an input replacement command according to the one of the plurality of second spare lanes connected to the one of the plurality of output lanes and outputs the input replacement command to the another connection interface.

4. The connection interface adapted for die-to-die according to claim 1, wherein in response to that the controller monitors any of the plurality of first usage lanes as the unhealthy lane, the controller generates an output replacement request according to the unhealthy lane and outputs the output replacement request to another connection interface, and in response to that the controller receives an input replacement command from the another connection interface, the controller changes the one of the plurality of receiving lanes which is currently connected to the unhealthy lane to be instead connected to the one of the plurality of first spare lanes corresponding to the input replacement command.

5. A lane connection method adapted for die-to-die, comprising:
   connecting a plurality of receiving lanes of a connection interface to a plurality of first usage lanes of the connection interface, wherein each of the plurality of receiving lanes is connected to a corresponding one of the plurality of first usage lanes;
   respectively monitoring the plurality of first usage lanes;
   changing one of the plurality of receiving lanes which is currently connected to an unhealthy lane to be instead connected to one of a plurality of first spare lanes of the connection interface in response to monitoring that any of the plurality of first usage lanes as the unhealthy lane;
   receiving input data through any of the plurality of first usage lanes or any of the plurality of first spare lanes, wherein the input data comprises testing data;
   performing a repair procedure on the unhealthy lane according to the testing data;
   determining whether a health level of the unhealthy lane is greater than a preset value, where the health level is obtained after the repair procedure is performed; and
   changing to serve the unhealthy lane as the one of the plurality of first spare lanes in response to determining that the health level is greater than the preset value.

6. The lane connection method adapted for die-to-die according to claim 5, further comprising:
   connecting a plurality of output lanes of the connection interface to a plurality of second usage lanes and a plurality of second spare lanes of the connection interface, wherein each of the plurality of output lanes is connected to a corresponding one of the plurality of second usage lanes and at least one of the plurality of second spare lanes.

7. The lane connection method adapted for die-to-die according to claim 5, further comprising:
   connecting a plurality of output lanes of the connection interface to a plurality of second usage lanes of the connection interface, wherein each of the plurality of output lanes is connected to a corresponding one of the plurality of second usage lanes, and each of the plurality of output lanes corresponds to at least one of a plurality of second spare lanes;
   changing one of the plurality of output lanes which is currently connected to the corresponding one of the plurality of second usage lanes and corresponds to an output replacement request to be instead connected to one of the at least one of the plurality of second spare lanes corresponding to the one of the plurality of output lanes in response to receiving the output replacement request from another connection interface;
   generating an input replacement command according to the one of the plurality of second spare lanes connected to the one of the plurality of output lanes; and
   outputting the input replacement command to the another connection interface.

8. The lane connection method adapted for die-to-die according to claim 5, wherein the step of changing the one of the plurality of receiving lanes which is currently connected to the unhealthy lane to be instead connected to the one of the plurality of first spare lanes of the connection interface comprises:
   generating an output replacement request according to the unhealthy lane;
   outputting the output replacement request to another connection interface; and
   changing the one of the plurality of receiving lanes which is currently connected to the unhealthy lane to be instead connected to the one of the plurality of first spare lanes corresponding to an input replacement command in response to receiving the input replacement command from the another connection interface.

* * * * *